July 12, 1927.
M. N. HURLEY
1,635,418
AUTOMOBILE BUMPER
Original Filed Oct. 5, 1925
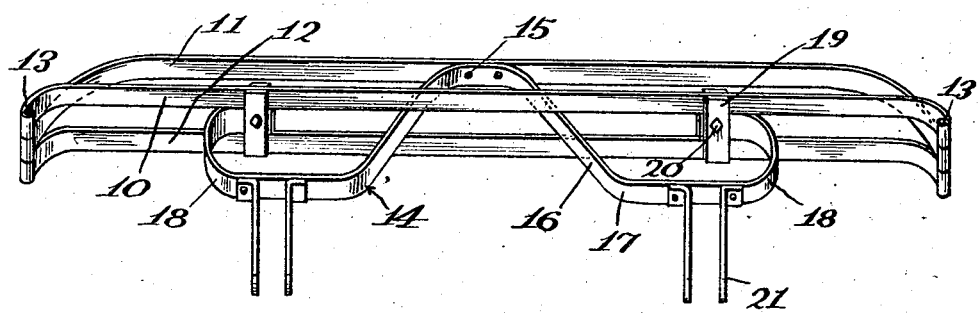
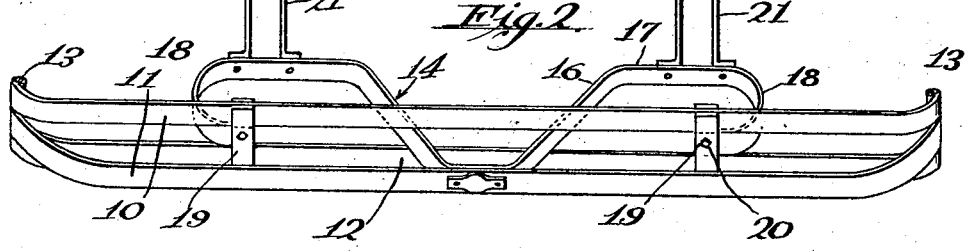
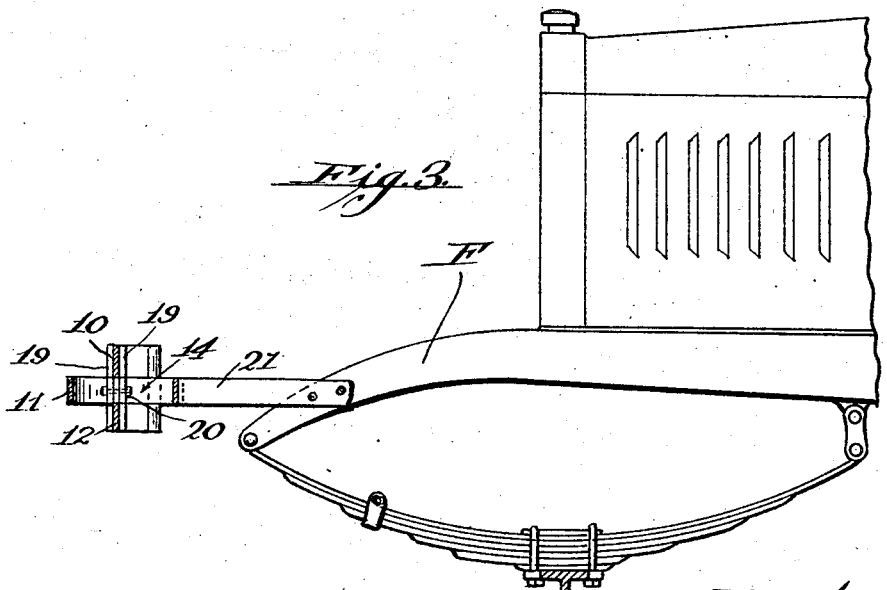
Inventor:
Mike N. Hurley.
by Hazard and Miller
Attorneys.

Patented July 12, 1927.

UNITED STATES PATENT OFFICE.

MIKE N. HURLEY, OF WHITTIER, CALIFORNIA.

AUTOMOBILE BUMPER.

Application filed October 5, 1925, Serial No. 60,666. Renewed May 25, 1927.

This invention relates to improvements in vehicle bumpers.

An object of this invention is to provide a bumper of improved construction which cannot easily be bent or broken, and which has especial qualities of give or elasticity, so that if the vehicle on which the bumper is mounted encounters an obstruction, the vehicle will be stopped without excessive jarring.

With the foregoing and other objects in view which will be made manifest in the following detailed description and specifically pointed out in the appended claims, reference is had to the accompanying drawings for an illustrative embodiment of the invention, wherein:

Figure 1 is a perspective view of the improved vehicle bumper from the rear side thereof, Fig. 2 is a perspective view of the improved bumper from the forward side thereof, and Fig. 3 is a partial view of a vehicle illustrating the manner of attaching the improved bumper.

Referring to the accompanying drawings wherein similar reference characters designate similar parts throughout, the improved bumper is made up of three transverse bars 10, 11 and 12. The top and bottom bars 10 and 12 are arranged in the same vertical plane, while the middle bar 11 is arranged in a vertical plane forwardly therefrom. The ends of the bars are all bent slightly rearwardly and have their extremities curled to provide apertures for the reception of pins or bolts 13, which connect the ends of the three bars together.

A fourth bar is provided, which is indicated at 14, and which has its central portion riveted or otherwise secured to the middle of the middle bar 11, as indicated at 15. Portions of the fourth bar 14, which are adjacent its middle, extend rearwardly and outwardly from the middle of the central bar 11, such as is indicated at 16. At 17 the ends of the fourth bar 14 are bent outwardly and the ends of the bar are then reversely bent upon themselves, as indicated at 18. These reversely bent ends of the bar are positioned between the top and bottom bars 12 and 10 respectively, and between suitable straps 19 which are secured to the top and bottom bars upon their opposite sides. Suitable bolts or rivets 20 pass through the straps 19 and through the ends of the bar 14, so that the ends of the bar 14 are connected to the top and bottom bars intermediate their ends. Suitable brackets 21 are provided upon the outwardly bent portions of the bar 14, so that the bumper may be easily mounted upon the frame F of a vehicle.

From the above described construction it will be readily appreciated that a rugged, substantial bumper is provided, which may be easily and simply constructed and which can be easily applied to a vehicle.

An advantage of the improved bumper resides in the fact that the middle bar 11 is arranged forwardly of the top and bottom bars. If an obstruction is encountered, but the vehicle on which the bumper is mounted is not moving with a high velocity, the middle bar alone will be deflected, and the give or resilient action will be absorbed in the divergent portion 16 of the fourth bar 14. As these portions are of considerable length, a considerable deflection of the middle bar 11 is possible. This is the action which takes place when the bumper strikes an obstruction with a small force. When the bumper strikes an obstruction with a greater force, the middle bar 11 is first deflected, and the top and bottom bars are also deflected, causing the reversely bent portions 18 of the fourth bar 14 to bend and allow all of the bars to move rearwardly. However, as the reversely bent portions 18 are relatively short and therefore fairly stiff, the deflection of the top and bottom bars is only a proportion of the deflection of the forward or middle bar. In this manner it will be readily appreciated that when the bumper strikes an obstruction with a great force that all of the bars act in absorbing the shock, and that the greater the shock the greater will be the deflection, and as the transverse bars approach their extreme deflected positions, there will be a greater force exerted by the fourth bar 14 to return the bars to their initial positions.

It will be understood that various changes may be made in the detail of construction without departing from the spirit or scope of the invention as defined by the appended claims.

I claim:

1. A vehicle bumper comprising three transverse bars, the top and bottom of which are in the same vertical plane, the middle bar being in a vertical plane forwardly of the other bars, means connecting the ends of the three bars together, a fourth bar having its central portion secured to the middle bar at approximately its middle and having its ends bent rearwardly between the top and bottom bars and then forwardly, means for connecting the ends of the fourth bar to the top and bottom bars, and means for mounting said fourth bar upon the frame of a vehicle.

2. A vehicle bumper comprising three transverse bars, the top and bottom bars being arranged in the same vertical plane and the middle bar being arranged in a different plane, means connecting the ends of the bars, and means for mounting the bars upon a vehicle frame, the middle bar being located most remote from the vehicle frame so as to be encountered first.

3. A vehicle bumper comprising three transverse bars, the top and bottom bars being arranged in the same vertical plane and the middle bar being arranged forwardly thereof, means connecting the ends of all of the bars together, and means for connecting all of the bars intermediate their ends to a vehicle frame.

4. A vehicle bumper comprising three transverse bars, the top and bottom bars being arranged in the same vertical plane and the middle bar being arranged forwardly thereof, means connecting the ends of all of the bars together, and means for connecting all of the bars to each other intermediate their ends and to a vehicle frame.

5. A vehicle bumper comprising three transverse bars, means connecting the ends of the bars together, a fourth bar having its central portion connected to the middle bar adjacent its middle, means connecting the fourth bar to a vehicle frame adjacent its ends, and means connecting the ends of the fourth bar to the top and bottom bars intermediate their ends.

In testimony whereof I have signed my name to this specification.

MIKE N. HURLEY.